United States Patent [19]
Lee

[11] Patent Number: 5,349,631
[45] Date of Patent: Sep. 20, 1994

[54] INBUILDING TELEPHONE COMMUNICATION SYSTEM

[75] Inventor: William C. Lee, Corona Del Mar, Calif.

[73] Assignee: AirTouch Communications, Walnut Creek, Calif.

[21] Appl. No.: 795,782

[22] Filed: Nov. 21, 1991

[51] Int. Cl.⁵ .................... H04M 11/00; H04Q 7/00
[52] U.S. Cl. ........................ 379/59; 379/58; 379/60; 455/33.1; 455/33.3; 455/34.1
[58] Field of Search ............ 379/56, 58, 59, 60; 455/33.1, 33.3, 34.1, 15, 17

[56] References Cited

U.S. PATENT DOCUMENTS

| | | | |
|---|---|---|---|
| 4,456,793 | 6/1984 | Baker et al. | 379/56 |
| 4,553,262 | 11/1985 | Coe | 455/15 |
| 4,639,914 | 1/1987 | Winters | 455/33.3 |
| 4,790,000 | 12/1988 | Kinoshita | 379/59 |
| 4,817,190 | 3/1989 | Comroe et al. | 455/17 |
| 4,837,858 | 6/1989 | Ablay et al. | 455/17 |
| 4,872,205 | 10/1989 | Smith | 455/34.1 |
| 4,879,740 | 11/1989 | Nagashima et al. | 455/33.1 |
| 4,955,082 | 9/1990 | Hattori et al. | 379/63 |
| 5,058,199 | 10/1991 | Grube | 455/15 |
| 5,127,042 | 6/1992 | Gillig et al. | 455/33.1 |
| 5,142,691 | 8/1992 | Freeburg et al. | 455/382 |
| 5,239,674 | 8/1993 | Comroe et al. | 455/33.1 |

Primary Examiner—Stephen Chin
Assistant Examiner—Vijay Shankar
Attorney, Agent, or Firm—Merchant, Gould, Smith, Edell, Welter & Schmidt

[57] ABSTRACT

An Inbuilding Communications System for providing telephone communication to a first set of portable telephones located in a first area and to a second set of portable telephones located in a second area; the first set of portable telephones transmit and receive a first set of radio signals having a set of assigned frequencies; the second set of portable telephones transmit and receive a second set of signals having the same set of assigned frequencies; the first and second areas are separated by a structure which attenuates radio signals. A first set of at least two antennas is located inside the first area for communicating with the first set of portable telephones. The number of antennas and the position of each antenna in the first set of antennas are chosen such that the first set of radio signals is attenuated below a pre-determined level after passing through the structure. A second set of at least two antennas is located inside the second area for communicating with the second set of portable telephones. The number of antennas and the position of each antenna in the second set of antennas are chosen such that tile second set of radio signals is attenuated below a pre-determined level after passing through the structure.

22 Claims, 6 Drawing Sheets

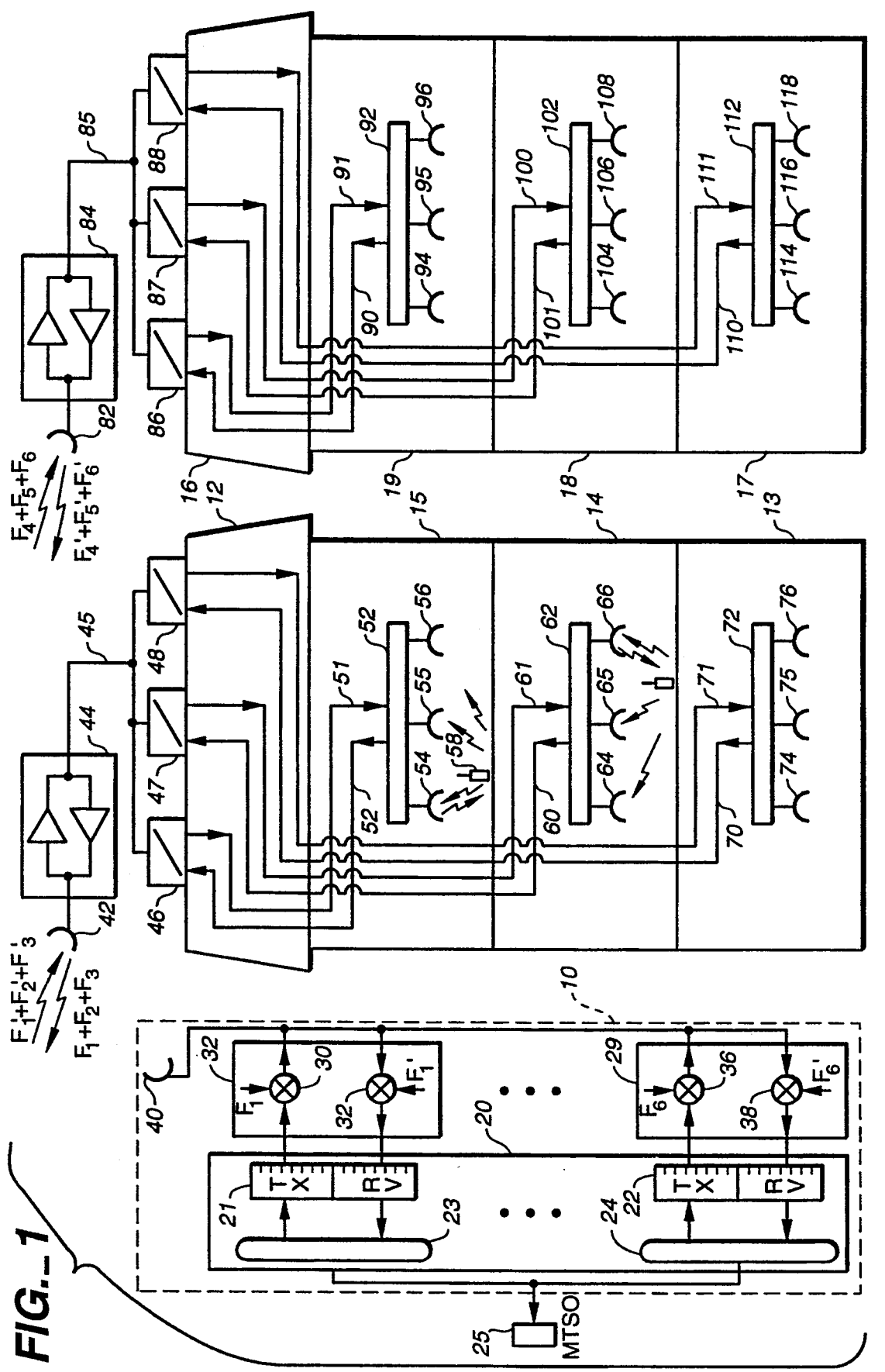
FIG._1

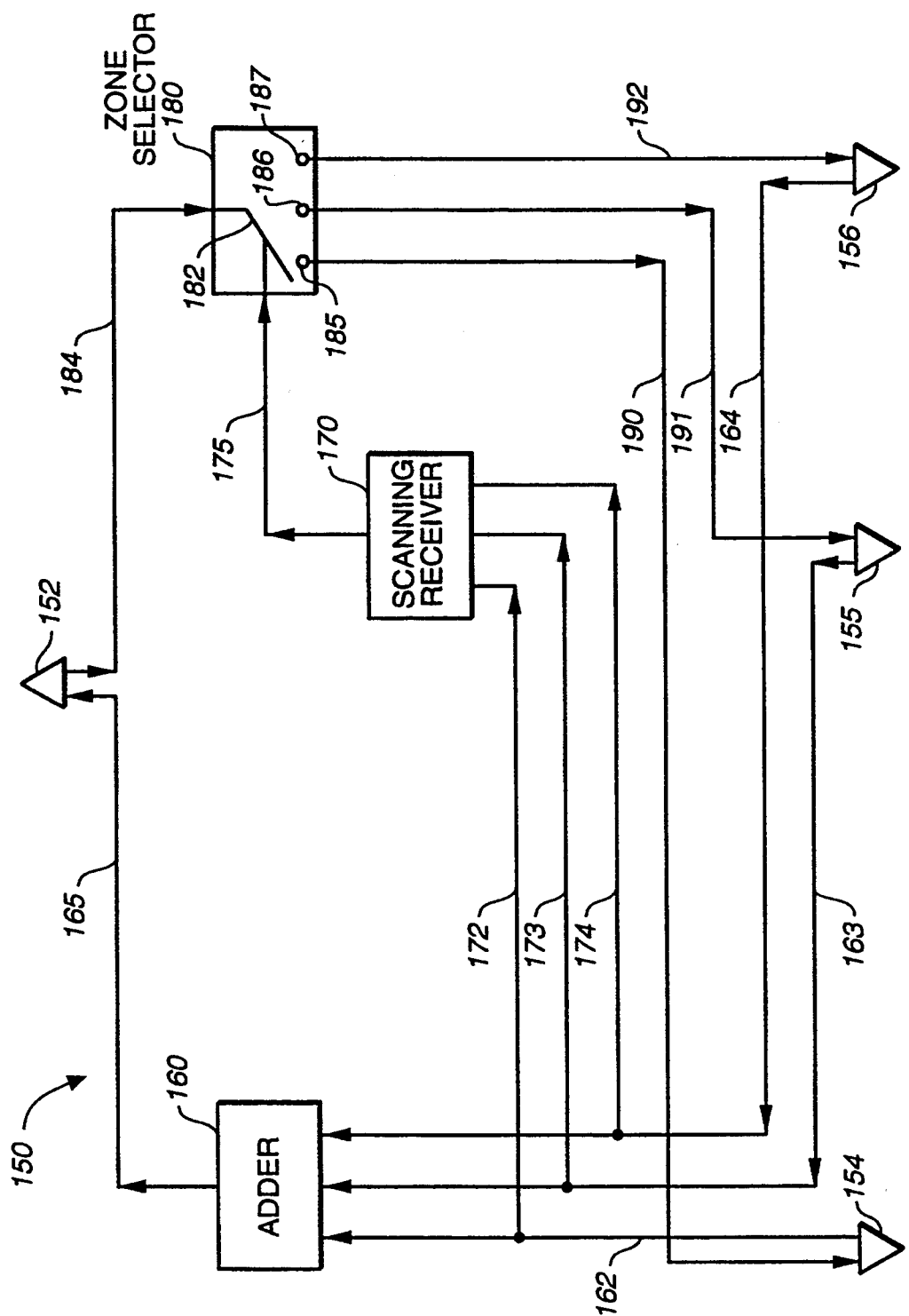
FIG._2

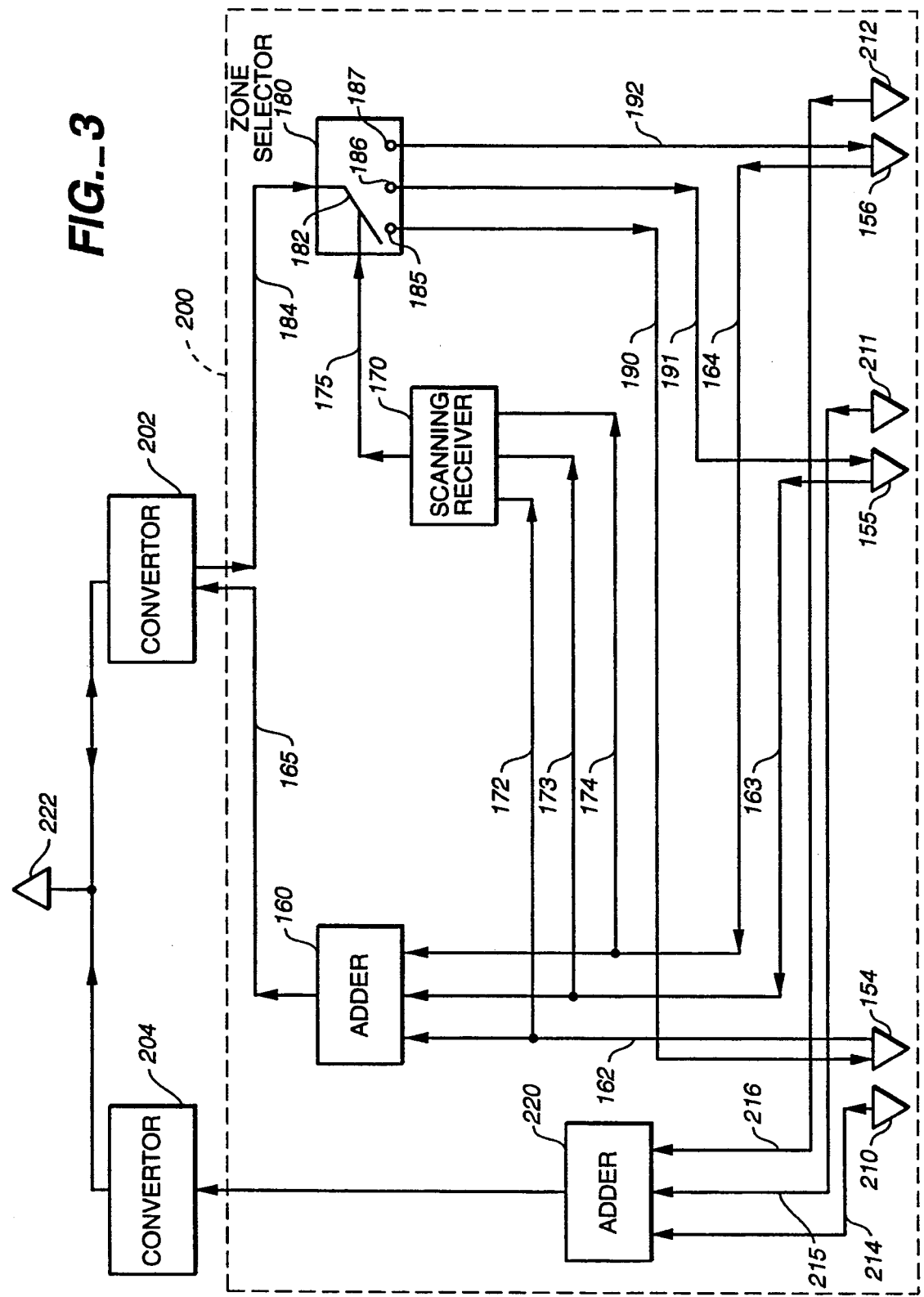

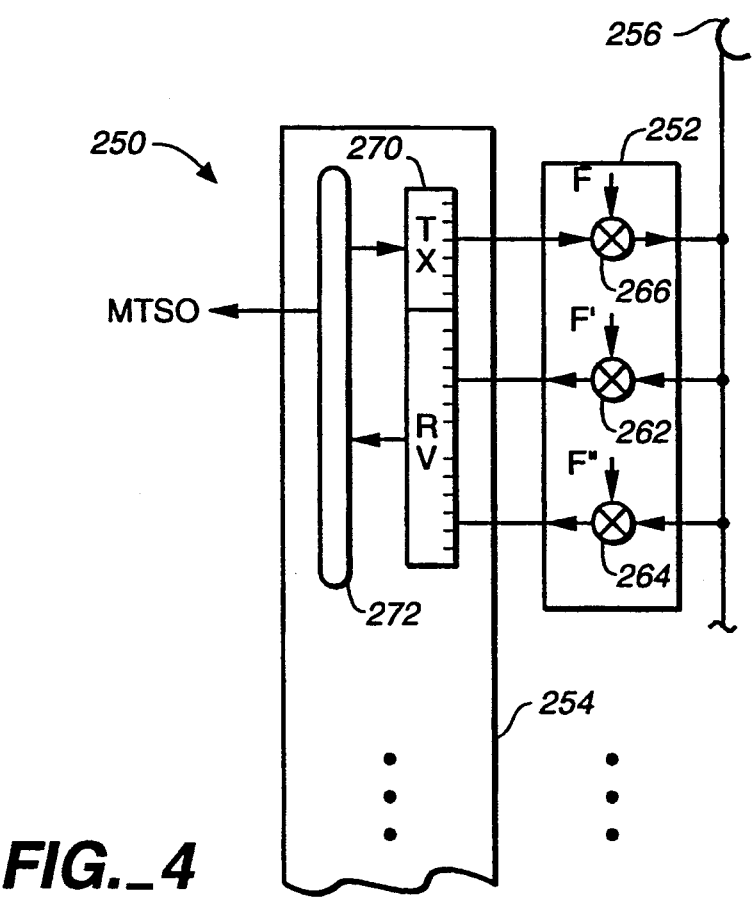
FIG._4

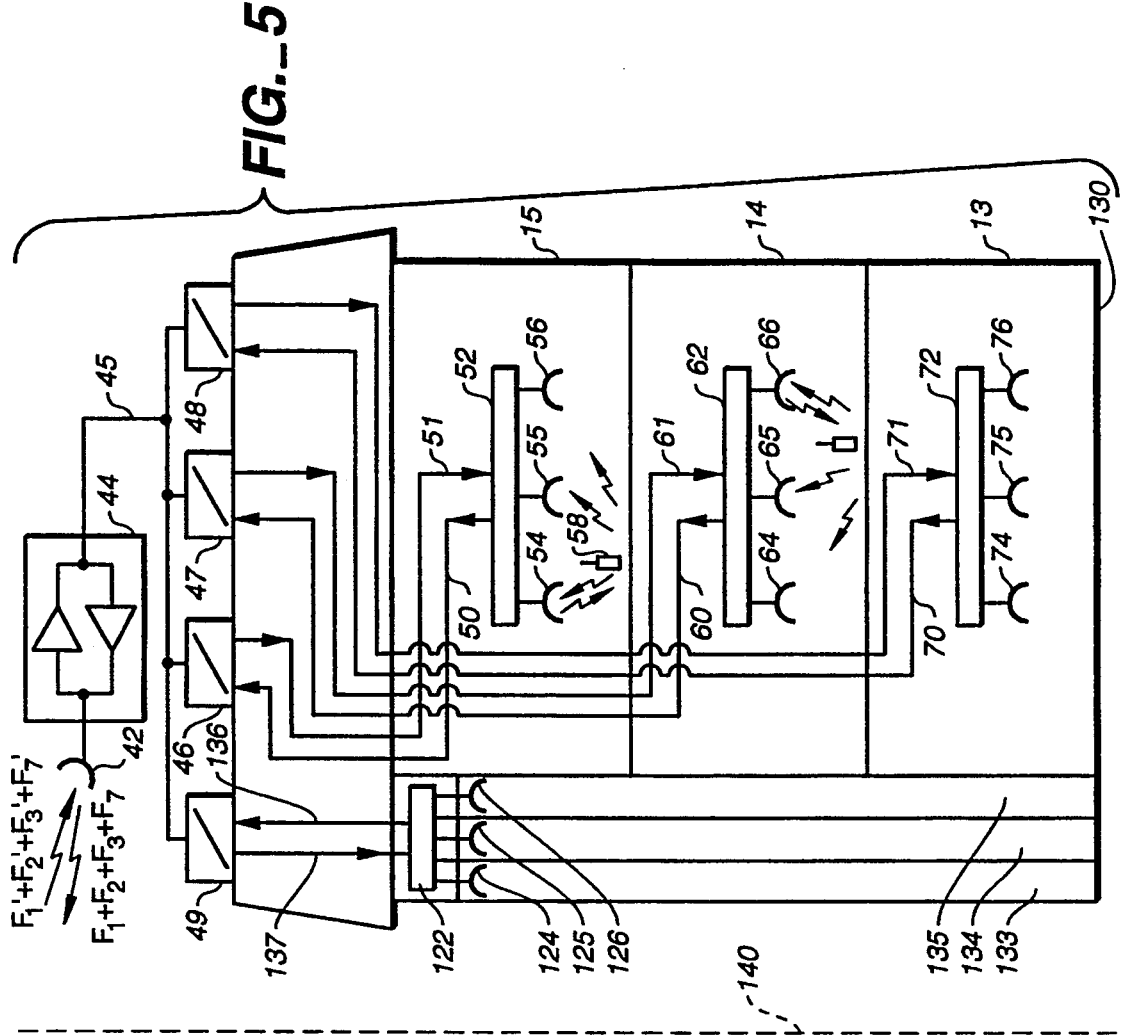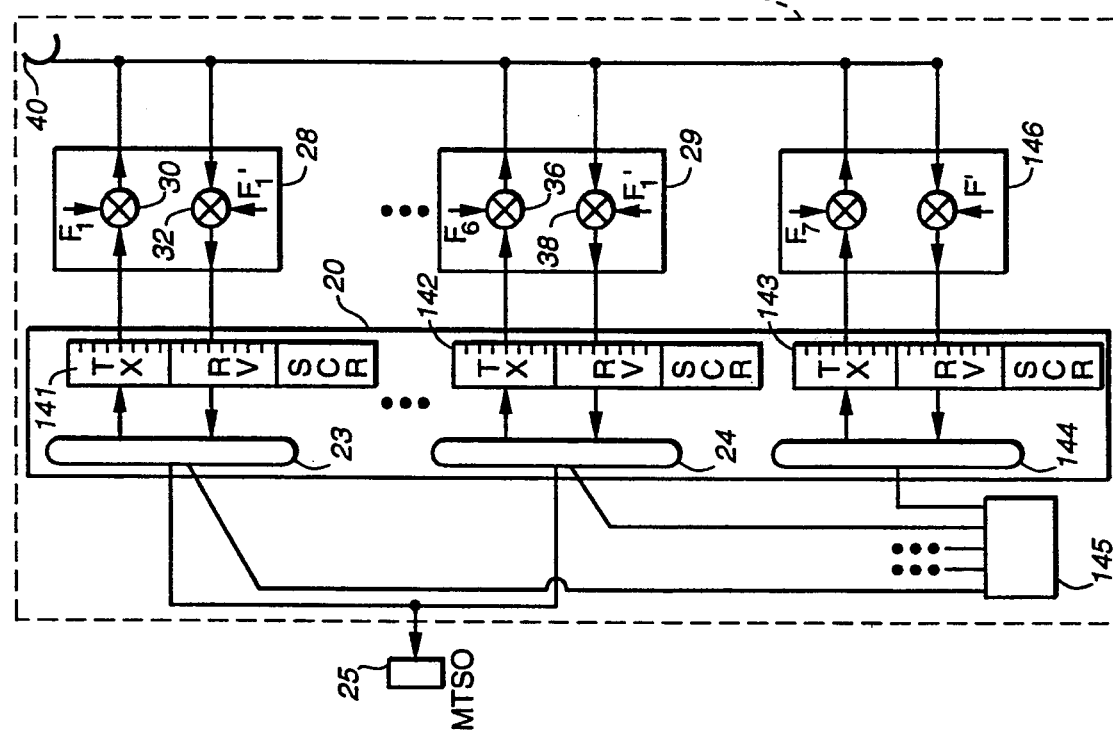
FIG._5

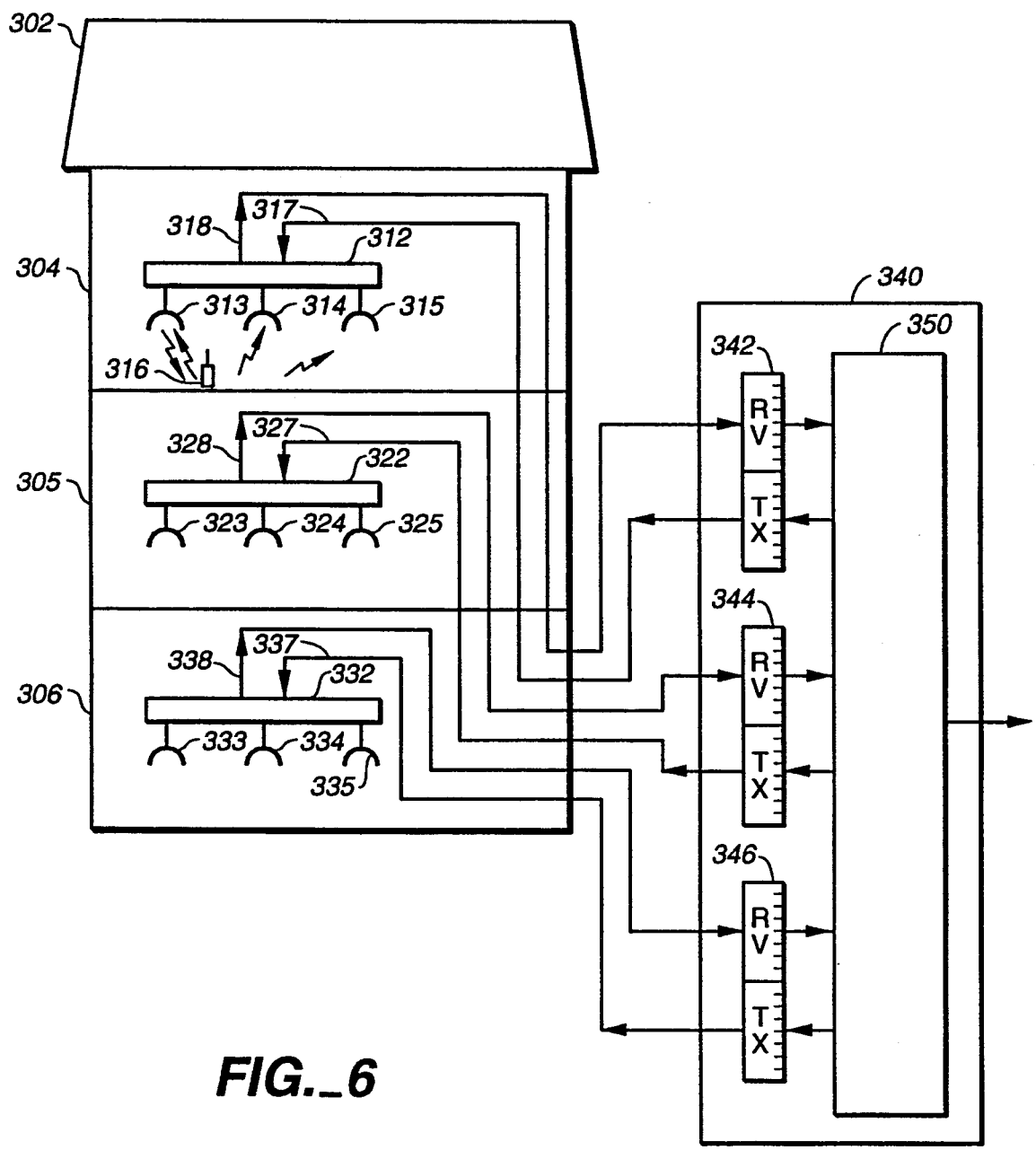
FIG._6

INBUILDING TELEPHONE COMMUNICATION SYSTEM

This invention relates to telephone communication systems, and more particularly, to a telephone communication system which allows the use of a plurality of portable telephones in a building.

BACKGROUND OF THE INVENTION

The use of a portable telephone in a building allows the user a degree of mobility not available from using a telephone which is attached to a telephone jack using a cable. As a result, there is a high demand for portable telephones. Prior art portable telephones have a transceiver and an antenna For transmitting radio signals to and receiving radio signals from a base unit. The base unit is typically coupled to a wireline telephone central office. The base unit also has a transceiver and an antenna for transmitting and receiving radio signals. The radio signal provides the means for communicating between the portable telephone and the base unit, and subsequently to other telephones through the telephone central office.

Even though there is a high demand for portable telephones, there is presently a limit on the number of portable telephones which can be utilized in a building. One of the limitations to the number of portable telephones is that the radio signal frequency spectrum assigned to portable telephones by regulatory agencies is limited. Effort has been made to better utilize this frequency spectrum. As an example, the frequency spectrum is divided into frequency channels having as narrow a band width as practical. Typically, each portable telephone is assigned one of these channels. Thus, the number of portable telephones is limited by the number of assignable channels.

One way to increase the number of portable telephones is to assign more than one portable telephone to the same frequency channel. However, one of the problems of such assignment is that there could be unacceptable interference between the portable telephones using the same channel. Interference occurs when the radio signal transmitted by one portable telephone affects the quality of the signal used by another portable telephone. Interference is especially significant when the intensity of the interfering signal is strong and is of substantially the same frequency as the signal which is interfered with.

One way to reduce interference is by separating the portable telephones using the same frequency channel by a physical structure, such as the flooring separating one floor from another, which attenuates radio signals. If the radio signal passing through the structure is reduced to a low level, it is possible that the interference is reduced to an acceptable level. One way to implement this method is to assign a set of frequency channels having different frequencies to the portable telephones on a floor of a building while the same set of frequency channels is assigned to the portable telephones located on a different floor. The interference between the portable telephones on the same floor is small because the frequencies used by the portable telephones are different. The interference between the portable telephones on different floors would also be small if the physical structure, such as the flooring, attenuates the radio signals passing through the structure to a low level. This method could also be used to allow the portable telephones located in different buildings to use the same set of frequency channels.

The above method has limitations because the physical structure separating the two sets of portable telephones may not be able to sufficiently attenuate the radio signals. Typically, the amount of attenuation to radio signals by a building wall is about 15-25 dB and by a building floor is about 20 dB. In order to avoid interference, the signal intensity of the radio signals on each floor cannot be too strong because of the finite amount of attenuation provided by the walls and the floor. However, a strong signal is required in order to increase the coverage of a portable telephone because there is a direct relationship between the signal intensity and the coverage. The maximum distance between the portable telephone and the base unit is determined by a number of factors. Among them are the separation distance, the physical condition of the building, and the intensity of the signals transmitted by the portable telephones. Typically, the signal intensity required to maintain communication is an increasing function of the separation distance. Thus, in order to cover the distances typically found in a building, the signal intensity may be higher than a level where interference acceptable.

As a result of the above limitations, the number of portable telephones allowed in a building is limited. Consequently, the demand for portable telephones often exceeds their availability. Accordingly, there is a need for an inbuilding communication system, i.e., a communication system which uses a plurality of portable telephones in the building or a portion of the building, which can reduce these limitations thereby allowing more telephones to be employed in the system.

SUMMARY OF THE INVENTION

Broadly stated, the present invention relates to an inbuilding communication system for providing telephone communication to a first set of portable telephones located in a first area and to a second set of portable telephones located in a second area. The first set of portable telephones transmit and receive a first set of radio signals having a set of assigned frequencies. The second set of portable telephones transmit and receive a second set of radio, signals having the same set of assigned frequencies used by the first set of portable telephones. The first and the second areas are separated by a structure which attenuates radio signals. A first set of at least two antennas is located inside the first area for communicating with the first set of portable telephones. The number of antennas and the position of each antenna in the first set of antennas are chosen such that the first set of radio signals are attenuated below a predetermined level after passing through the structure. A second set of at least two antennas is located inside the second area for communicating with the second set of portable telephones. The number of antennas and the position of each antenna in the second set of antennas are chosen such that the second set of radio signals are attenuated below a predetermined level after passing through the structure. The inbuilding communication system also comprises a first selection means for selecting a selected antenna of the first set of antennas for transmitting a selected radio signal of the first set of radio signals to a corresponding one of the first set of portable telephones. The selected antenna of the first set of antennas requires the lowest signal intensity for transmitting the selected radio signal of the first set of radio signals to the corresponding one of the first set of portable telephones. The inbuilding communication system further comprises a second selection means for selecting a selected antenna of the second set of antennas for transmitting a selected radio signal of the second set of radio signals to a corresponding one of the second set of portable telephones. The selected antenna of the second set of antennas requires the lowest signal intensity for transmitting the selected radio signal of the second set of radio signals to the corresponding one of the second set of portable telephones.

Therefore, it is an object of the present invention to provide an inbuilding communication system.

It is another object of the present invention to provide an inbuilding communication system wherein the same set of frequency channels is used in different areas of the same building or in different buildings.

It is a further object of the present invention to provide a wireless private branch exchange system (PBX) inside a building.

These and other objects of the present invention will become apparent to those skilled in the art from the following detailed description of the invention and from the accompanying drawings.

BRIEF DESCRIPTION OF THE DRAWINGS

FIG. 1 is a drawing showing one embodiment of an inbuilding communication system according to the present invention.

FIG. 2 is a block diagram of a zone site signal processing unit according to the present invention.

FIG. 3 is a block diagram of a zone site signal processing unit and its associated converters using a diversity scheme according to the present invention.

FIG. 4 is block diagram of a master site using a diversity scheme according to the present invention.

FIG. 5 is a drawing showing another embodiment of an inbuilding communication system according to the present invention.

FIG. 6 is a drawing showing a wireless private branch exchange using an inbuilding communication system according to the present invention.

DETAILED DESCRIPTION OF THE INVENTION

FIG. 1 is a system diagram showing one embodiment of an inbuilding communication system, i.e., a communication system which uses a plurality of portable telephones in the building or a portion of the building, according to the present invention. The communication system comprises a master site 10 for transmitting signals to and receiving signals from at least one building via an antenna 40 and for coupling signals to and from a cellular inbuilding telephone system. It is to be understood that the communication system according to the present invention can also be coupled to a wireline telephone central office and is not limited to coupling to the cellular telephone system. The cellular telephone system provides a plurality of telephone communication channels to the inbuilding communication system. In FIG. 1, two buildings 12 and 16 are shown. Each building has three floors, labeled as floors 13-15 for building 12 and 17-19 for building 16. The number of buildings and the number of floors shown in FIG. 1 are for illustrative purposes only, and the present invention is not limited to two buildings each having three floors.

Master site 10 includes a conventional cell site 20 for providing a plurality of telephone communication channels to the inbuilding communication system. Cell site 20 includes a plurality of radio frames, shown in FIG. 1 as reference numerals 21 and 22, and a plurality of cell site controllers, shown as reference numerals 23 and 24, coupled to the corresponding radio frame. Each radio frame includes a plurality of radio transmitters and a plurality of radio receivers, each being assigned a different frequency. A transmitter and a receiver are used to communicate with a transmitter and a receiver of a corresponding portable telephone located in one of the floors of one of the buildings 12 and 16. For example, a transmitter and a receiver of radio frame 21 are used to communicate with a corresponding portable telephone located in floor 15 of building 12. Similarly, a transmitter and a receiver of radio frame 22 are used to communicate with a corresponding portable telephone located in floor 19 of building 16.

The same set of frequencies are assigned to all the radio frames. Thus, the same set of frequencies assigned to radio frame 21 is also assigned to radio frame 22. Such arrangement allows the frequency spectrum to be used more efficiently, if the problems associated with interference can be resolved. One aspect of the present invention is a means to reduce such interference.

Each radio frame is coupled to a corresponding cell site controller. Thus, radio flames 21 and 22 are coupled to cell site controllers 23 and 24, respectively. The cell site controllers are in turn coupled to a mobile telephone switch office (MTSO) 25. Both the cell site controllers 23 and 24 and MTSO 25 are well known in the an and are available from several vendors.

It should be understood by a person of ordinary skill in the art that other means for providing telephone communication channels may also be used. For example, a private branch exchange (PBX) could be used to replace cell site 20. Similarly, a wireline telephone central office could be used to replace MTSO 25.

In a cellular telephone system, the bandwidth of each channel is preferably 30 KHz. The frequency spectrum of the channels in the cellular telephone system is preferably 50 MHz and the carrier frequency of each channel is preferably about 850 MHz in the UHF frequency range. Various methods, both digital and analog, have been developed to use the same spectrum in a cellular telephone system to provide service to more than one user. Examples of such methods are time-division multiple access, frequency-division multiple access, and code-division multiple access.

The inbuilding communication system according to the present invention uses the same set of cellular communication channels for each floor buildings 12 and 16. In a typical building of three floors, forty channels per floor are sufficient to satisfy the need of most users. One of the forty channels is preferably a setup channel for transmitting control information between master site 10 and each floors of buildings 12 and 16. In this case, cell site 20 provides a set of forty assigned cellular communication channels, and by using multiple access methods i.e. allowing more than one user to use a cellular communication channel, two hundred and forty users in buildings 12 and 16 can access the telephone system at the same time.

Each cellular communication channel is associated with one portable telephone in each floor. Since there are six floors in buildings 12 and 16, each cellular communication channel is associated with six portable telephones. Preferably, the frequency of the radio signal assigned to a portable telephone for use inside its floor is the same as the frequency of the associated cellular communication channel. Consequently, the portable telephones used in the inbuilding communication system could be low cost conventional portable cellular telephones.

Since the same set of frequencies are used in all the floors, this arrangement allows the radio frequency spectrum, an increasingly valuable resource, to be used more efficiently. As pointed out above, if the intensity of the radio signals are strong, there would be unacceptable interference of the radio signals from adjacent floors and from adjacent buildings. One aspect of the present invention is to provide a means, described below, for reducing such interference of the radio signals.

Another problem with using the same set of channels on each floor is that there must be a way for master site 10 to associate the radio signals, which has the same set of frequencies on each floor, to the corresponding floor. Another aspect of the present invention is to provide a means for separately communicating the forty channels in each floor of buildings 12 and 14 to master site 10.

The communication link between master site 10 and buildings 12 and 16 is described first. A microwave communication link is preferably used. This is because a microwave communication link provides line-of-sight communication which is highly directional. As a result, only the buildings aimed at by antenna 40, in this case, buildings 12 and 16, receive the microwave signal. In addition, the cost of a microwave communication link is low and the reliability is high because it is an established technology. However, other types of communication links, such as an optical-fiber communication link, can also be used.

In order to provide a microwave communication link that can separately communicate with each floor of buildings 12 and 14, master site 10 includes a plurality of frequency converters, such as converters 28 and 29, for converting radio signals having a cellular frequency, i.e., about 850 MHz, to and from a microwave signal having microwave frequency, preferably about 23 GHz or 40 GHz. Each converter comprises an up-converting mixer for up-converting the signals from the forty cellular communication channels to a transmitting microwave signal and a down-converting mixer for down-converting the received microwave signal to the cellular frequency of the forty channels. The microwave frequency used by each converter is different. As explained below, each converter communicates only with a corresponding converter associated with one of the floors in building 12 and 16. Thus, these converters provide a communication link between master site 10 and each floor of buildings 12 and 16.

As an example, converter 28 includes an up-converting mixer 30 having a frequency of $F_1$ in the microwave range. The signals of the forty channels transmitted by radio frame 21 modulate the microwave signal having frequency $F_1$. The resulting modulated microwave signal is sent to the buildings via antenna 40. Converter 28 also includes a down-convening mixer 32 having a frequency of $F_1'$ in the microwave range. The microwave signal received by antenna 40 having a frequency of $F_1'$ is down-converted by mixer 32 to the signals of the forty channels which are received by the receiver in radio frame 21. As explained below, only one of the floors in buildings 12 and 16, in this case, floor 15, is able to convert the microwave signals having frequencies $F_1$ and $F_1'$. As a result, converter 28 provides a communication linkage between cell site 20 and floor 15.

Similarly, converter 29 includes an up-convening mixer 36 having a frequency of $F_6$ and a down-convening mixer 38 having a frequency of $F_6'$. Converter 29 converts the same forty communication channels used by radio frame 22 in a similar manner as converter 28. Again, only one of the floors in buildings 12 and 16, in this case, floor 19, is able to convert the microwave signals having frequencies $F_6$ and $F_6'$. As a result, converter 29 provides a communication link between cell site 20 and floor 19.

The number of converters in master site 10 is preferably the same as the number of locations serviced by master site 10. In the system shown in FIG. 1, there are two buildings, 12 and 16, having three floors each. Thus, there should preferably be six converters using six pairs of microwave frequencies $F_1$, $F_1'$, $F_2$, $F_2'$, $F_3$, $F_3'$, $F_4$, $F_4'$, $F_5$, $F_5'$, $F_6$, and $F_6'$. However, each floor in each building uses the same forty communication channels. As explained below, even though the same communication channels are used, the present invention reduces the interference between the floors and between the buildings to an acceptable level.

The communication system of one of the buildings, building 12, is now described. Building 12 includes an antenna 42 and a microwave amplifier 44 for enhancing the transmitting and receiving microwave signals. Amplifier 44 receives and amplifies microwave signals from antenna 42 and couples these signals to three converters 46–48 via line 45. Amplifier 44 also receives and amplifies the microwave signal generated by converters 46–48 and couples these signals to antenna 42 for transmitting to master site 10. Amplifier 44 preferably includes broadband microwave amplifiers which could amplify microwave signals in the frequency band $F_1$–$F_6$ and $F_1'$–$F_6'$.

Converter 46 in building 12 has a similar structure as converter 28 in master site 10. Consequently, its detailed structure is not shown in FIG. 1. Converter 46 down-converts the microwave signal having a frequency of $F_1$ to the radio signals of the forty communication channels used by the portable telephones. Convert 46 also up-converts the radio signals of the forty communication channels to a microwave signal having a frequency of $F_1'$. As a result of the use of the same pair of frequencies, $F_1$ and $F_1'$, by converters 28 and 46, these two converters are able to communicate with one another.

Similarly, converters 47 and 48 up-convert to microwave frequencies $F_2'$ and $F_3'$, respectively, and down-convert from microwave frequencies $F_2$ and $F_3$, respectively.

The converters 46–48 are preferably located on the top of building 12. This is because signal loss resulting from connecting microwave components, in this case, antenna 42, amplifier 44, and converters 46–48, could be a serious problem. The signal loss is reduced by reducing the connection distance of antenna 42, amplifier 44, and converters 46–48. Since antenna 42 is preferably located on top of building 12, amplifier 44 and converters 46–48 are also preferably located on top of building 12. On the other hand, signal loss at the frequency of the communication channel, preferably around 850 MHz, is not a significant problem. Thus, long cables, preferably TV cable, could be used to provide low cost connections between the converters 46–48 to the other communication components located in each floor.

Similarly, building 16 includes an antenna 82, amplifier 84, and converters 86–88 for receiving and transmitting microwave signals. Antenna 82, amplifier 84, and converters 86–88 in building 16 function in the same way as antenna 42, amplifier 44, and converters 46–48, respectively, in building 12. However, the frequency of the converters are different. Thus, converters 86–88 up-convert to microwave frequencies $F_4'$, $F_5'$, and $F_6'$, respectively, and down-convert from microwave frequencies $F_4$, $F_5$, and $F_6$, respectively. As a result, each converters in the buildings 12 and 16 is able to communicate with a corresponding one of the converters in master site 10.

It can be seen from the above that a microwave link is provided such that each converter communicates only with a corresponding converter associated with one of the floors in building 12 and 16. Even though each floor uses the same set of frequency channels for communicating with the portable telephones in the floor, the microwave link provides a means for master site 10 to identify the signal generated from each floor.

It is apparent to a person of ordinary skill in the an that even though a microwave communication link is described, other communication links could also be used. For example, if it is not desirable to provide a line-of-sight communication link, an optical fiber communication link could be used between master site 10 and buildings 12 and 16. In this case, converters 28, 29, 46–48, and 86–88 are optical frequency converters.

Returning now to building 12, converter 46 is coupled via lines 50 and 51 to a zone site signal processing unit 52 located in floor 15. As mentioned above, lines 50 and 51 are preferably TV cables. Signal processing unit 52 collects radio signals generated by portable telephones, such as telephone 58, via a plurality of inbuilding UHF antennas, such as antennas 54–56, and sends these signals to converter 46. Signal processing unit 52 also directs the signals from converter 46 to the inbuilding antennas closest to the corresponding telephones. For example, only antenna 54 is used to transmit a signal to telephone 58 because portable telephone 58 is closest to antenna 54. The structure of unit 52 will be described later. It should be understood that even though FIG. 1 shows three inbuilding antennas in each floor, any number of antennas could be used.

The advantage of using unit 52 and a plurality of antennas 54–56 is that the signal intensity required to cover floor 15 is reduced when compared to the case where only one antenna is used. This is because each one of the three antennas 54–56 only needs to transmit signals of sufficient strength to cover a portion of the floor space. Since the intensity of a radio signal required to reach a portable telephone is an increasing function of the distance between the antenna and the portable telephone, such reduction in coverage could drastically reduce the signal intensity. As a result, interference resulting from the low intensity radio signal is also reduced. The number of antennas is selected such that the intensity of the radio signals generated by unit 52 and the portable telephones in floor 15 are sufficiently attenuated by the flooring and the walls of building 12 so that these signals do not interfere with signals on the other floors or in building 16.

Each floor in building 12 has a system similar to the one used in floor 15. Thus, lines 60 and 61, zone site signal processing unit 62, and antennas 64–66 in floor 14 correspond to lines 50 and 51, zone site signal processing unit 52, and antennas 54–56, respectively in floor 15. Similarly, lines 70 and 71, zone site signal processing unit 72, and antennas 74–76 in floor 13 correspond to lines 50 and 51, zone site signal processing unit 52, and antennas 54–56, respectively in floor 15.

Each floor of building 16 also includes a zone site signal processing unit and a plurality of antennas. Thus, lines 90 and 91, unit 92, and antennas 94–96 in floor 19 function in a similar manner as line 50, unit 52, and antennas 54–56, respectively, in floor 15. Similarly, line 100, unit 102, and antennas 104–106 in floor 18, and line 110, unit 112, and antennas 114–116 in floor 17 function in a similar manner as line 50, unit 52, and antennas 54–56, respectively, in floor 15.

It can be seen from the above that a means has been described which allows the same set of frequencies to be used by the radio signals in each floor. The problem of radio frequency interference between adjacent floors and adjacent buildings has been solved.

FIG. 2 is a block diagram showing the detail structure of a zone site signal processing unit 150 according to the present invention. The structure of zone site signal processing units 52, 62, 72, 92, 102, and 112, shown in FIG. 1, are similar to the structure of zone site signal processing unit 150. Unit 150 comprises a port 152 for coupling to a converter, such as converter 46, and three ports 154–156 for coupling to three inbuilding antennas, such as antennas 54–56, shown in floor 15.

The signals transmitted by the portable telephones and received by the antennas are coupled to an adder 160 via lines 162–164. Adder 160 adds the signals collected by all the antennas and sends the combined signal to port 152 via line 165. By combining the signals received by all the antennas before sending to port 152, the intensity of the resulting signal increases. The signals on lines 162–164 are also coupled to a zone scanning receiver 170 via lines 172–174. Zone scanning receiver 170 compares the intensity of the radio signals received by each antenna and outputs a selection signal to a switch 182 inside a zone selector 180 via a line 175. Switch 182 couples the incoming signal at line 184, which is the down-converted signal at port 152, to one of the three terminals 185–187. The terminals 185–187 are coupled to ports 154–156, respectively, via lines 190–192, respectively. The selection signal couples the signal from line 184 to the antenna which receives the strongest signal from the portable telephone. Since the antenna receiving the strongest signal is also closest to the portable telephone, only the antenna which is closest to the portable telephone transmits to the portable telephone. The other antennas only receive the signal and do not transmit.

The procedure to direct the incoming signals from port 152 to the inbuilding antenna receiving the strongest signal transmitted by a portable telephone is performed for each of the forty communication channels. This is because the portable telephones could be located near any one of the three antennas. In order to direct the channel to the fight telephone, it is necessary to determine the location of the strongest signal for each channel.

If it is desirable to increase the signal strength of the signals, signal enhancers, well known in the art, for increasing signal strength, could be connected to ports 154–156. In addition, if the area of each floor is small enough so that only two antennas are required, a T-combiner could be used to replace zone selector 180.

It is possible to improve the performance of the in-building communication system by using a diversity scheme. In a diversity scheme, a pair of diversity antennas is used to replace a single inbuilding antenna. The members of the pair of diversity antennas are preferably placed close to each other. Thus, if a diversity scheme is used in the system shown in FIG. 1, each floor will have three pairs of diversity antennas, i.e., a total of six in-building antennas. Further, the communication system also needs to include additional components for processing the signals from the added antennas. It is known that a diversity scheme could reduce multi-path fading of radio signals, i.e., the fading of the signal due to its propagation from one point to another on more than one path. Thus, if one member of the pair of diversity antennas has trouble in receiving a signal from a portable telephone due to multi-path fading, the other member could pick up the radio signal. The improvement in using diversity scheme is especially significant when the signal strength is weak, which is the case here.

As mentioned above, additional components need to be included in the inbuilding communication system of FIG. 1 in order to use a diversity scheme. FIG. 3 shows a block diagram of a zone site diversity signal processing unit 200 and two converters 202 and 204. Unit 200 is similar to unit 150, shown in FIG. 2, except for the components which are added for the diversity scheme. Converter 202 is an up-down converter which corresponds to converters 46–48 and 86–88 in FIG. 1. Thus, converter 202 down-converts a microwave signal having a frequency of, say F, to cellular frequency signals and up-converts the cellular frequency signals received by unit 200 to a microwave signal having a frequency of, say F'. Converter 204 is an up-converter, not shown in FIG. 1, which is used to up-convert the diversity signals received by the additional diversity antennas to a microwave signal having a frequency of, say F'''. Both converters 202 and 204 are preferably placed on top of buildings 12 and 16 while unit 200 is preferably placed inside each floor.

The same reference numerals are assigned to the components in unit 200 which function in the same way as the components in unit 150, shown in FIG. 2. These components are not described in detail here. Unit 200 further includes three additional ports 210–212 for coupling to three antennas. The antennas coupled to ports 154 and 210 are members of a pair of diversity antennas. Similarly, the antennas coupled to ports 155 and 211 form another pair of diversity antennas while the antennas coupled to ports 156 and 212 form the third pair of diversity antennas. The signals received by ports 210–212 are coupled to an adder 220 through three lines 214–216, respectively.

In FIG. 3, only the signals received by ports 154–156 are coupled to scanning receiver 170. However, it is possible to couple the signals received by ports 154–156 and ports 210–212 to scanning receiver 170. In this case, scanning receiver 170 should be able to process six pairs of signals for each communication channel. The advantage of processing six pairs of signals is that the accuracy of locating the appropriate antenna for a portable telephone increases. The disadvantage is the additional cost involved because both the processing speed and the number of signal paths of scanning receiver 170 need to be increased.

Adder 220 is coupled to converter 204 which up-converts the signals received by ports 210–212 to a microwave signal having a frequency of F'''. This microwave signal together with the microwave signal generated by converter 202 are then sent to port 222. Port 222 is coupled to microwave amplifier 45, shown in FIG. 1, for transmission to the master site.

In order to process the microwave signal having a frequency of F''', the master site needs to have a means for down-converting the additional diversity signal. FIG. 4 shows a block diagram of a master site 250 including a diversity converter 252, a cell site 254, and an antenna 256. Converter 252 has two mixers 262 and 264 for down-converting microwave signals having frequencies of F' and F'''. Converter 252 also has a mixer 266 for up-converting the cellular communication channels to a microwave frequency having a frequency of F. Except for the ability to convert the diversity signals using mixer 264, converter 252 functions in a similar manner as converter 28, shown in FIG. 1. Master site 250 has a plurality of converters, similar to converter 252, for communicating with each floor of buildings 12 and 16.

Cell site 254 includes a radio frame 270. Radio frame 270 comprises a transmitter for transmitting cellular frequency signals to mixer 266 and a diversity receiver for receiving cellular frequency signals from mixers 262 and 264. Radio frame 270 is coupled to a cell site controller 272 which is in turn coupled to the MTSO. Both radio frame 270 and cell site controller 272 are well known in the art. Cell site controller 272 functions in a similar manner as cell site converter 23 of FIG. 1. Except for the use of a diversity receiver, radio frame 270 functions in a similar manner as radio frame 21 of FIG. 1. Cell site 254 has a plurality of radio flames and cell site controllers.

It is often desirable to allow a user to continue his telephone communication while he moves from one floor to another. As mentioned before, the inbuilding communication system shown in FIG. 1 allows different users located on different floors to use the same communication channel. If a user on one of the floors, say, floor 15, moves to another floor, say, floor 13, using an elevator, the telephone communication has to be terminated as soon as the portable unit enters the elevator. No service is provided in the elevator. This arrangement is to avoid the possibility that the communication channel used by the user originally located on floor 15 is being used by a user on floor 13. As a result, additional components are needed to allow the user to continue his telephone communication when he is inside the elevator.

In order to include the above-mentioned feature in the inbuilding communication system according to the present invention, a floor switching means for switching the communicating channel used by the user as he moves from one floor to another is preferably installed. An inbuilding communication system including a floor switching means according to the present invention is shown in FIG. 5.

FIG. 5 shows a building 130 and a master site 140. Building 130 is similar to building 12, shown in FIG. 1. However, the floors are connected by an elevator system comprising a plurality of elevator shafts 133–135 having an elevator in each shaft. Thus, the elevators and the shafts constitute a connecting area between floors 13–15. Although only one building is shown in FIG. 5, the present invention is not limited to one building.

The communication components in building 130 of FIG. 5 comprise the same components as those in building 12 of FIG. 1 together with a converter 49, a signal processing unit 122, and three antennas 124–126. The same reference numerals are used for the components which are common to FIGS. 1 and 5. Antennas 124–126 are preferably mounted on top of the elevator shafts 133–135, respectively. However, they may also be mounted on the individual elevators in the shafts. These antennas are coupled to signal processing unit 122. Signal processing unit 122 functions in a similar way as signal processing units 52, 62, and 72, located on the 5 floors of building 142. Signal processing unit 122 is coupled to converter 49 by a pair of lines 136 and 137. The number of antennas is determined by the number of elevator shafts and is not determined by the number of floors in building 142.

A set of elevator communication channels, which is different from the set of assigned floor communication channels used by floors 13–15, is assigned to the elevator shafts. The three shafts share the same set of assigned elevator communication channels. Thus, the elevator shafts comprises a "virtual cell" site. As explained in detail below, as a portable telephone moves from a floor, say floor 15, to one of the three elevator shafts, communication continues using one of the assigned elevator communication channels. Signal processing unit 122 directs communication to the antenna located in the elevator shaft at which the portable telephone is located. As the portable telephone leaves the elevator shaft and moves to a different floor, say, floor 13, a new communication channel from the set of floor communication channels, which might be different from the one used by the portable telephone on floor 15, is assigned to the portable telephone.

The inbuilding communication system in FIG. 5 includes a master site 140. Master site 140 comprises the same components in master site 10, shown in FIG. 1, with the exception of a new set of radio frame 141–143, a "virtual" cell site controller 144, a local port exchange 145, and a converter 146. The same reference numerals are used for the components which are common to FIGS. 1 and 5. Radio flames 141 and 142 transmit and receive the set of floor communication channels while radio frame 143 transmits and receives the set of elevator communication channels. As mentioned above, the set of assigned elevator communication channels is different from the set of floor communication channels. Radio frames 141–143 further comprises a set of scanning receivers which scans both sets of elevator and floor communication channels. The function of the scanning receivers will be described below. Local port exchange 145 pertains "hand-in" operations by switching between the communication channels assigned to the floors and those assigned to the elevator shafts. Radio flames 141–143 are coupled to local port exchange 145 through cell site controllers 23, 24, and 144, respectively. However, only cell site controllers 23 and 24 are coupled to MTSO 25.

The microwave communication link will now be described. The conversion of the floor communication channels generated by radio frames 141 and 142 into microwave signals and the conversion of the microwave signals into floor communication channels received by radio frames 14 1 and 142 are similar to those described in FIG. 1. Radio frame 143 is coupled to converter 146 which upconverts the set of elevator communication channels to a microwave signal having a frequency $F_7$. Converter 146 also down converts a microwave signal having a frequency of $F_7'$ into a set of elevator communication channels. The microwave signals are sent and received by antenna 40.

The microwave signal is also convened by converter 49 located in building 130. Thus, the microwave signal having a frequency of $F_7$ is downconvened to a set of elevator communication channels. Similarly, the set of elevator communication channels transmitted by the portable telephone inside elevator shafts is up-converted to a microwave signal having a frequency of $F_7'$.

The operation of the inbuilding communication system of FIG. 5 including a floor switching means will now be described. As a portable telephone which is carrying a telephone communication is moving from one of the floor, say, floor 15, into an elevator, the scanning receiver in radio frame 143, which is associated with the elevator, detects a sharp rise in the signal strength of the floor communication channel associated with the portable telephone. At the same time, the scanning receiver in radio frame 141 detects a sharp drop in the signal strength of the floor communication channel. Since radio frame 141 is associated with floor 15, as discussed in FIG. 1, it is possible to determine the floor on which the portable telephone is originally located. When the signal strength of the floor communication channel detected by radio frame 143 is above a threshold level, one of the idle elevator communication channels is assigned to the portable telephone by cell site controller 144 through local port exchange 145, i.e., a hand-in occurs. Note that the switching is performed without going through MTSO 25. As a result, the load on MTSO 25 is not increased.

When the portable telephone leaves the elevator and enters a different floor, say, floor 13, the scanning receiver associated with floor 13 detects a sharp rise in the signal strength of the elevator communication channel. When the signal strength of the elevator communication channel is above a threshold level, local port exchange 145 performs another hand-in operation by assigning an idle floor communication channel to the portable telephone. Again, MTSO 25 is not involved in the operation.

It should be note that the hand-in algorithm, described above, is different from the hand-off algorithm used in conventional cellular telephone system. In the conventional hand-off algorithm, a switching is performed when the signal strength of the signal from a neighboring cell is below a threshold level. On the other hand, the hand-in algorithm directs a switching when the signal strength of the signal from a neighboring cell is above a threshold level.

The inbuilding communication system according to the present invention can also be used to implement a wireless private branch exchange (PBX) system. FIG. 6 shows a wireless PBX system according to the present invention as implemented in a building 302. In FIG. 6, building 302 is shown to have three floors, 304–306. However, the invention is not limited to be used in a building having three floors. The wireless PBX system allows a portable telephone located in building 302 to communicate either with other telephones outside the building via a wireline telephone central office or a cellular switch or with other portable telephones located inside building 302 without going through the wireline telephone central office or the cellular switch.

Each floor of building 302 has a zone site signal processing unit and a plurality of antennas. Thus, floor 304 includes a zone site signal processing unit 312 and three antennas 313–315. Similarly, floor 305 includes a zone site signal processing unit 322 and three antennas 323–325 while floor 306 includes a zone site signal processing unit 332 and three antennas 333–335. The structure of units 312, 322, and 332 are the same as the structure of zone site signal processing unit 150, shown in FIG. 2.

The frequency spectrum used for communicating between the zone site signal processing unit and the portable telephones are preferably the same in each floor. Preferably, the carrier frequency is about 850 MHz. As pointed out above, normally, there would be unacceptable interference between the radio signals of adjacent floors. The inbuilding communication system according to the present invention reduces the interference to an acceptable level by using a plurality of antennas transmitting low intensity radio signals. The number of antennas is chosen such that the intensity of the radio signals required for communicating with a portable telephone, say telephone 316 located in floor 304, is reduced to a level such that the radio signals, after attenuation by the walls and floors, do not interfere with the radio signals of the other floors.

Unit 312 is coupled to a radio frame 342 inside a PBX switch 340 through lines 317 and 318. Similarly, unit 322 and 332 are coupled to radio frames 344 and 346, respectively, inside PBX switch 340 through lines 327–328 and 337–338, respectively. The physical location of PBX switch 340 is not important. Thus, switch 340 could be located at any floor inside building 302. Switch 340 could also be located outside building 302. If the distance between PBX switch 340 and units 322, 332, and 342 are short, regular cables or TV cables are preferably used because they are inexpensive. In this case, the frequency of the signals carried by lines 317–318, 327–328, and 337–338 should preferably stay below 850 MHz because the signal loss could be high at higher frequencies. If the separation between PBX switch 340 and units 322. 332, and 342 are long, an optical fiber communication link is preferably used. If an optical fiber communication link is used, converters should be inserted between switch 340 and units 322, 332, and 342 in a similar manner as described in the inbuilding communication system of FIG. 1.

Radio frames 342, 344, and 346 are coupled to a PBX controller 350 which is in turn coupled to the wireline telephone central office or a cellular switch. Controller 350 determines whether the call from a portable telephone inside building 302 is directed to another portable telephone inside building 302. If the answer is affirmative, controller 350 couples the call to the appropriate channel of the appropriate radio frame so that communication between the calling telephone and the called telephone is established. If the portable telephone wants to call another telephone outside of building 302, controller 350 couples the calling telephone to the wireline telephone central office or the cellular switch. The coupling between controller 350 and the wireline telephone central office could be through a T1 carrier, a microwave link, or an optical fiber. If a T1 carrier is used, the radio signal of the portable telephone having a frequency of about 850 MHz is beat down to the base band. If a microwave link or an optical fiber is used, a converter, similar to those described above, is needed to convert the radio signal to a microwave signal or an optical signal.

Various modifications of the invention, in addition to those shown and described herein, will be apparent to those skilled in the art from the foregoing description and accompanying drawings. Such modifications are intended to fall within the scope of the appended claims.

What is claimed is:

1. An inbuilding communication system for providing telephone communication to a first set of portable telephones located in a first area and to a second set of portable telephones located in a second area, the first set of portable telephones transmitting and receiving a first set of radio signals having a set of assigned frequencies, the second set of portable telephones transmitting and receiving a second set of radio signals having the same set of assigned frequencies used by the first set of portable telephones, the first and the second areas being separated by a structure which attenuates radio signals, said inbuilding communication system comprising:

a first set of at least two antennas located inside the first area communicating with the first set of portable telephones over the first set of radio signals, the number of antennas and the position of each antenna in said first set of antennas being chosen such that said first set of antennas is able to communicate with the first set of telephones at all locations in the first area above predefined minimum signal levels and such that the first set of radio signals is attenuated below a predetermined level after passing through the structure so as to reduce interference between the first and second set of radio signals;

a second set of at least two antennas located inside the second area for communicating with the second set of portable telephones over the second set of radio signals, the number of antennas and the position of each antenna in said second set of antennas being chosen such that said second set of antennas is able to communicate with the second set of telephones at all locations in the second area above predefined minimum signal levels and such that the second set of radio signals is attenuated below a predetermined level after passing through the structure so as to reduce interference between the first and second set of radio signals;

first selection means for selecting an antenna of said first set of antennas for transmitting a first selected radio signal of the first set of radio signals to a corresponding one of the first set of portable telephones, said selected antenna of said first set of antennas requiring the lowest signal intensity for transmitting said first selected radio signal of the first set of radio signals to said corresponding one of the first set of portable telephones; and second selection means for selecting an antenna of said second set of antennas for transmitting a first selected radio signal of the second set of radio signals to a corresponding one of the second set of portable telephones, said selected antenna of said second set of antennas requiring the lowest signal intensity for transmitting said first selected radio signal of the second set of radio signals to said corresponding one of the second set of portable telephones.

2. The inbuilding communication system of claim 1 wherein said first selection means comprises:

first scanning means coupled to said first set of antennas for generating a first selection signal, said first selection signal indicating said selected antenna of said first set of antennas being the antenna which receives the highest signal strength of the radio signal transmitted by said corresponding one of the first set of portable telephones; and first zone selection means responsive to said first selection signal for directing said first selected radio signal of the first set of radio signals for transmission to said selected antenna of said first set of antennas.

3. The inbuilding communication system of claim 2 wherein said second selection means comprises:
second scanning means coupled to said second set of antennas for generating a second selection signal, said second selection signal indicating said selected antenna of said second set of antennas being the antenna which receives the highest signal strength of the radio signal transmitted by said corresponding one of the second set of portable telephones; and
second zone selection means responsive to said second selection signal for directing said first selected radio signal of the second set of radio signals for transmission to said selected antenna of said second set of antennas.

4. The inbuilding communication system of claim 1 further comprising means for providing at least one telephone communication channel and means for coupling at least one said telephone channel to said first and said second selection means.

5. The inbuilding communication system of claim 4 wherein said means for coupling comprises:
first conversion means coupled to said means for providing for converting a first signal of at least one said telephone communication channel to a first carrier signal having a first carrier frequency;
second conversion means coupled to said means for providing for converting a second signal of said at least one telephone channel to a second carrier signal having a second carrier frequency;
third conversion means coupled to said first selection means for convening said first carrier signal to said first selected radio signal of the first set of radio signals; and
fourth conversion means coupled to said second selection means for convening said second carrier signal to said first selected radio signal of the second set of radio signals.

6. The inbuilding communication system of claim 5 wherein said first selection means further includes a first adder for generating a first combined signal by adding a second selected radio signal of the first set of radio signals received by said first set of antennas and wherein said second selection means further includes a second adder for generating a second combined signal by adding a second selected radio signal of the second set of radio signals received by said second set of antennas.

7. The inbuilding communication system of claim 6 wherein said means of coupling further comprises:
fifth conversion means coupled to said first adder of said first selection means for convening said first combined signal to a third carrier signal having a third carrier frequency;
sixth conversion means coupled to said second adder of said second selection means for converting said second combined signal to a fourth carrier signal having a fourth carrier frequency;
seventh conversion means coupled to said means for providing for converting said third carrier signal to said at least one communication channel: and
eighth conversion means coupled to said means for providing for converting said fourth carrier signal to said at least one communication channel.

8. The inbuilding communication system of claim 7 wherein said first, said second, said third, and said fourth carrier signals are microwave signals.

9. The inbuilding communication system of claim 7 wherein said first, said second, said third, and said fourth carrier signals are optical signals.

10. The inbuilding communication system of claim 4 wherein said means for providing comprises a cell site coupled to a mobile telephone switch office.

11. The inbuilding communication system of claim 4 wherein said means for providing comprises a private branch exchange.

12. The inbuilding communication system of claim 7 wherein said first set of antennas further includes a first set of diversity antennas and wherein said first selection means further includes a third adder for generating a third combined signal by adding the signal received by said first set of diversity antennas.

13. The inbuilding communication system of claim 12 wherein said second set of antennas further includes a second set of diversity antennas and wherein said first selection means further includes a fourth adder for generating a fourth combined signal by adding the signal received by said second set of diversity antennas.

14. The inbuilding communication system of claim 13 wherein said means of coupling further comprises:
ninth conversion means coupled to said third adder of said first selection means for convening said third combined signal to a fifth carrier signal having a fifth carrier frequency;
tenth conversion means coupled to said fourth adder of said second selection means for convening said fourth combined signal to a sixth carrier signal having a sixth carrier frequency;
eleventh conversion means coupled to said means for providing for convening said fifth carrier signal to said at least one communication channel: and
twelfth conversion means coupled to said means for providing for convening said sixth carrier signal to said at least one communication channel.

15. The inbuilding communication system of claim 1 further comprising means for allowing a member of the first set of portable telephones to continue its telephone communication as it moves from the first area to a connecting area and from the connecting area to the second area.

16. The inbuilding communication system of claim 15 wherein said means for allowing comprises:
means for assigning a third set of radio signals having a set of assigned frequencies different from said set of assigned frequencies of said first and said second sets;
at least one antenna located in the connecting area for transmitting and receiving signals; and
switching means for switching said member of the first set of portable telephones from using said first set of radio signals to using said third set of radio signals as said member moves from the first area to the connecting area and for switching said member from using said third set of radio signals to using said second set of radio signals as said member moves from the connecting area to the second area.

17. The inbuilding communication system of claim 16 wherein said switching means comprises:
a first scanning receiver associated with the first area for detecting the signal strength of radio signals;
a second scanning receiver associated with the second area for detecting the signal strength radio signals;

a third scanning receiver associated with the connecting area for detecting the signal strength of radio signals;

means for switching said member of the first set of portable telephones from using said first set of radio signals to using said third set of radio signals when said first scanning receiver detects a sharp drop in the signal strength of the radio signal transmitted by said member and when the signal strength of the radio signal transmitted by said member and detected by said third scanning receiver is above a first predetermined value; and means for switching said member of the first set of portable telephones from using said third set of radio signals to using said second set of radio signals when the signal strength of the radio signal transmitted by said member and detected by said second scanning receiver is above a second predetermined value.

18. An inbuilding communication system for providing telephone communication to a first set of portable telephones located in a first floor of a building and to a second set of portable telephones located in a second floor of the building, the first set of portable telephones transmitting and receiving a first set of radio signals having a set of assigned frequencies, the second set of portable telephones transmitting and receiving a second set of radio signals having the same set of assigned frequencies used by the first set of portable telephones, the first and the second floor being separated by a structure which attenuates radio signals, said inbuilding communication system comprising:

means for providing a plurality of telephone communication channels;

first conversion means coupled to said means for providing for converting a first signal of said plurality of telephone communication channels to a first carrier signal having a first carrier frequency;

second conversion means coupled to said means for providing for converting a second signal of said plurality of telephone channels to a second carrier signal having a second carder frequency;

third conversion means for convening said first carrier signal to a first selected radio signal of the first set of radio signals; and fourth conversion means for converting said second carrier signal to a first selected radio signal of the second set of radio signals;

a first set of at least two antennas located inside the first floor for communicating with the first set of portable telephones, the number of antennas and the position of each antenna in said first set of antennas being chosen such that the first set of radio signals is attenuated below a predetermined level after passing through the structure;

a second set of at least two antennas located inside the second floor for communicating with the second set of portable telephones, the number of antennas and the position of each antenna in said second set of antennas being chosen such that the second set of radio signals is attenuated below a predetermined level after passing through the structure;

first scanning means coupled to said first set of antennas for generating a first selection signal indicative of the antenna of said first set of antennas which receives the highest signal strength of the radio signal transmitted by said corresponding one of the first set of portable telephones;

first zone selection means responsive to said first selection signal for directing said first selected radio signal of the first set of radio signals for transmission to said antenna of said first set of antennas indicated by said first selection signal:

second scanning means coupled to said second set of antennas for generating a second selection signal indicative of the antenna of said second set of antennas which receives the highest signal strength of the radio signal transmitted by said corresponding one of the second set of portable telephones;

second zone selection means responsive to said second selection signal for directing said first selected radio signal of the second set of radio signals for transmission to said antenna of said second set of antennas indicated by said second selection signal;

a first adder for generating a first combined signal by adding a second selected radio signal of the first set of radio signals received by said first set of antennas;

a second adder for generating a second combined signal by adding a second selected radio signal of the second set of radio signals received by said second set of antennas;

fifth conversion means coupled to said first adder for converting said first combined signal to a third carrier signal having a third carrier frequency;

sixth conversion means coupled to said second adder for converting said second combined signal to a fourth carrier signal having a fourth carrier frequency;

seventh conversion means coupled to said means for providing for converting said third carder signal to a third signal of said plurality of communication channels; and eighth conversion means coupled to said means for providing for converting said fourth carrier signal to a fourth signal of said plurality of communication channels.

19. The inbuilding communication system of claim 18 wherein said means of providing comprises a cell site coupled to a mobile telephone switch office.

20. The inbuilding communication system of claim 18 wherein said means of providing comprises a private branch exchange.

21. An inbuilding communication system for providing telephone communication to a set of portable telephones located in a location having a first area, a second area, and a connecting area connecting the first and the second areas, the set of portable telephones transmitting and receiving a first set of radio signals having a set of assigned frequencies in the first and the second areas, said inbuilding communication system including means for allowing a member of the set of portable telephones to continue its telephone communication as it moves from the first area to the connecting area and from the connecting area to the second area, said means for allowing comprising:

means for assigning a second set of radio signals having a set of assigned frequencies different from the set of assigned frequencies of the set;

at least one antenna located in the connecting area for transmitting and receiving signals; and switching means for switching said member of the set of portable telephones from using said first set of radio signals to using said second set of radio signals as said member of the set of portable telephones moves from the first area to the connecting area and for switching said member of the set of portable telephones from using said second set of radio signals to using said first set of radio signals as said member of the set of portable telephones moves from the connecting area to the second area.

22. The inbuilding communication system of claim 21 wherein said switching means comprises:
- a first scanning receiver associated with the first area for detecting the signal strength of radio signals;
- a second scanning receiver associated with the second area for detecting the signal strength of radio signals;
- a third scanning receiver associated with the connecting area for detecting the signal strength radio signals;
- means for switching said member of the set of portable telephones from using the first set of radio signals to using the second set of radio signals when said first scanning receiver detects a sharp drop in the signal strength of the radio signal transmitted by said member and when the signal strength of the radio signal transmitted by said member and detected by said third scanning receiver is above a first predetermined value; and
- means for switching said member of the set of portable telephones from using said second set of radio signals to using said first set of radio signals when the signal strength of the radio signal transmitted by said member and detected by said second scanning receiver is above a second predetermined value.

* * * * *

UNITED STATES PATENT AND TRADEMARK OFFICE
CERTIFICATE OF CORRECTION

PATENT NO. : 5,349,631
DATED : September 20, 1994
INVENTOR(S) : William C. Lee

It is certified that error appears in the above-indentified patent and that said Letters Patent is hereby corrected as shown below:

Column 1, line 16, after "antenna", "For" should read --for--.

Column 2, line 44, after "radio", strike the comma (",").

Column 4, line 30, before "and", "an" should read --art--.

Column 6, line 2, after "a" (second occurrence), "down-conven-" should read -- down-convert- --.

Column 7, line 19, after "the", "an" should read --art--.

Column 10, line 7, "down-convening" should read --down-converting--.

Column 11, line 58, after "frames", "14 1" should read --141--; line 66, "convened" should read --converted--; line 68, "downconvened" should read --downconverted--.

Column 13, line 34, after "322" strike the period (".") and substitute therefor a comma --,--.

UNITED STATES PATENT AND TRADEMARK OFFICE
CERTIFICATE OF CORRECTION

PATENT NO. : 5,349,631
DATED : September 20, 1994
INVENTOR(S) : William C. Lee

It is certified that error appears in the above-indentified patent and that said Letters Patent is hereby corrected as shown below:

Column 15, line 34, "convening" should read --converting--; line 38, "convening" should read --converting--; line 53, "convening" should read --converting--.

Column 16, line 26, "convening" should read --converting--; line 30, "convening" should read --converting--; line 34, "convening" should read --converting--; line 37, "convening" should read --converting--.

Signed and Sealed this

Twenty-eight Day of February, 1995

Attest:

BRUCE LEHMAN

*Attesting Officer*     *Commissioner of Patents and Trademarks*